US006672687B2

(12) United States Patent
Nishio

(10) Patent No.: US 6,672,687 B2
(45) Date of Patent: Jan. 6, 2004

(54) VEHICLE MOTION CONTROL DEVICE

(75) Inventor: Akitaka Nishio, Anjo (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 0 days.

(21) Appl. No.: 09/988,413

(22) Filed: Nov. 19, 2001

(65) Prior Publication Data

US 2002/0063469 A1 May 30, 2002

(30) Foreign Application Priority Data

Nov. 17, 2000 (JP) ........................... 2000-351656

(51) Int. Cl.$^7$ ................................. B60T 8/88
(52) U.S. Cl. .................. 303/122.09; 303/113.4; 303/122.08
(58) Field of Search .............. 303/122.01, 122.05, 303/122.08, 122.09, 122.11, 139, 140, 113.3, 113.4, 116.1, 3

(56) References Cited

U.S. PATENT DOCUMENTS

| | | |
|---|---|---|
| 5,707,117 A | 1/1998 | Hu et al. |
| 5,954,406 A * | 9/1999 | Sawada ............ 303/122.09 |
| 6,289,271 B1 * | 9/2001 | Isono et al. ............ 701/31 |
| 6,431,662 B2 * | 8/2002 | Isono et al. ........... 303/114.3 |
| 6,463,378 B2 * | 10/2002 | Nishio ................. 701/70 |

FOREIGN PATENT DOCUMENTS

| | | |
|---|---|---|
| DE | 198 04 077 A1 | 8/1999 |
| EP | 0 267 018 A2 | 11/1988 |
| EP | 0 379 329 A2 | 7/1990 |

* cited by examiner

*Primary Examiner*—Matthew C. Graham
*Assistant Examiner*—Xuan Lan Nguyen
(74) *Attorney, Agent, or Firm*—Burns, Doane, Swecker & Mathis, LLP

(57) ABSTRACT

A vehicle motion control device which detects an abnormality of an automatic hydraulic pressure generator having a master cylinder, a booster which boosts the master cylinder and a booster actuator which actuates the booster irrespective of brake pedal operation and performs an appropriate transaction upon detecting the abnormality. The vehicle motion control device includes the automatic hydraulic pressure generator, a hydraulic pressure control valve disposed between the automatic hydraulic pressure generator and a wheel cylinder, and a controller performing the automatic pressure increase control by actuating the hydraulic pressure control valve and the booster actuator according to the vehicle running condition. By calculating a master cylinder hydraulic pressure based on a variable state of the booster actuator and comparing the calculated value with the master cylinder hydraulic pressure detected by a hydraulic pressure sensor, an abnormality of the automatic hydraulic pressure generator is detected during non-operation of the brake pedal.

17 Claims, 10 Drawing Sheets

VEHICLE MOTION CONTROL DEVICE

This application is based on and claims priority under 35 U.S.C. §119 with respect to Japanese Application No. 2000-351656 filed on Nov. 17, 2000, the entire content of which is incorporated herein by reference.

FIELD OF THE INVENTION

The present invention generally relates to a vehicle motion control device. More particularly, the present invention pertains to a vehicle motion control device for supplying hydraulic pressure generated by an automatic hydraulic pressure generator, which is adapted to generate the hydraulic pressure irrespective of operation of a brake pedal, to a wheel cylinder via hydraulic pressure control valves. The vehicle motion control device of the present invention is applicable to a brake steering control device and a traction control device.

BACKGROUND OF THE INVENTION

Japanese Patent Laid-Open Publication No. H02-241863 discloses a vehicle motion control device. In this known device, when the driving wheels are spinning, a master cylinder hydraulic pressure is generated by a vacuum booster which is automatically operated by a solenoid valve for braking the spinning wheels irrespective of the operation of a brake pedal. Thus, traction control is performed.

However, with the foregoing vehicle motion control device, abnormalities involving the automatic hydraulic pressure generator, including the master cylinder, the vacuum booster and the solenoid valve, are not detected. Thus, traction control may not be appropriately carried out under abnormal conditions of the hydraulic pressure generator.

A need thus exists for a vehicle motion control device which is able to detect an abnormality with respect to the automatic hydraulic pressure controller having a master cylinder, a booster for boosting the master cylinder, and a booster actuator for actuating the booster irrespective of operation of a brake pedal and for performing an appropriate transaction or control even when an abnormality is detected or exists.

SUMMARY OF THE INVENTION

According to one aspect of the invention, a vehicle motion control device includes a wheel cylinder equipped on a vehicle wheel for providing braking torque, and an automatic hydraulic pressure generator including a master cylinder, a booster and a booster actuator. The master cylinder supplies a master cylinder hydraulic pressure to the wheel cylinder, the booster boosts actuation of the master cylinder in accordance with operation of a brake pedal, and the booster actuator actuates the booster irrespective of the operation of the brake pedal and generates the master cylinder hydraulic pressure in the master cylinder. A hydraulic pressure control valve is disposed between the automatic hydraulic pressure generator and the wheel cylinder for controlling a brake hydraulic pressure of the wheel cylinder, and a control mechanism controls the booster actuator of the automatic hydraulic pressure generator and the hydraulic pressure control valve in accordance with the running condition of the vehicle and performs an automatic pressure increase control to the wheel cylinder. An abnormality detecting mechanism detects an abnormality of the automatic hydraulic pressure generator, and an abnormality transaction mechanism performs a predetermined transaction with respect to the automatic pressure increase control by the control mechanism when the abnormality detecting mechanism detects the abnormality of the automatic hydraulic pressure generator.

According to another aspect of the invention, a vehicle motion control device includes a wheel cylinder operatively associated with a vehicle wheel for applying a braking force, and an automatic hydraulic pressure generator including a master cylinder, a booster and a booster actuator. The master cylinder supplies a master cylinder hydraulic pressure to the wheel cylinder, the booster boosts actuation of the master cylinder in accordance with operation of a brake pedal, and the booster actuator actuates the booster irrespective of the operation of the brake pedal and generates the master cylinder hydraulic pressure in the master cylinder. A hydraulic pressure control valve is disposed between the automatic hydraulic pressure generator and the wheel cylinder for controlling a brake hydraulic pressure of the wheel cylinder, and a controller controls the booster actuator of the automatic hydraulic pressure generator and the hydraulic pressure control valve in accordance with a running condition of the vehicle and performs an automatic pressure increase control to the wheel cylinder. A deceleration detector detects or estimates a vehicle deceleration of the vehicle, and a hydraulic pressure detector detects the master cylinder hydraulic pressure. A mechanism is provided for determining whether at least one of the deceleration detector and the hydraulic pressure detector is operating normally. An abnormality detector detects an abnormality of the automatic hydraulic pressure generator only when it is determined that at least one of the deceleration detector and the hydraulic pressure detector is operating normally, and an abnormality transaction mechanism performs a predetermined transaction with respect to the automatic pressure increase control by the controller when the abnormality detecting mechanism detects the abnormality of the automatic hydraulic pressure generator.

Another aspect of the invention involves a method of controlling vehicle motion in a vehicle that includes a wheel cylinder operatively associated with a vehicle wheel for applying a braking force to the wheel, an automatic hydraulic pressure generator having a master cylinder, a booster and a booster actuator, with the master cylinder supplying master cylinder hydraulic pressure to the wheel cylinder, the booster boosting actuation of the master cylinder in accordance with operation of a brake pedal and the booster actuator actuating the booster irrespective of operation of the brake pedal to generate the master cylinder hydraulic pressure in the master cylinder, and a hydraulic pressure control valve disposed between the automatic hydraulic pressure generator and the wheel cylinder for controlling a brake hydraulic pressure of the wheel cylinder. The method includes controlling the booster actuator of the automatic hydraulic pressure generator and the hydraulic pressure control valve based on a running condition of the vehicle to perform an automatic pressure increase control to the wheel cylinder, detecting an abnormality of the automatic hydraulic pressure generator, and performing a predetermined operation with respect to the automatic pressure increase control when an abnormality of the automatic hydraulic pressure generator is detected.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
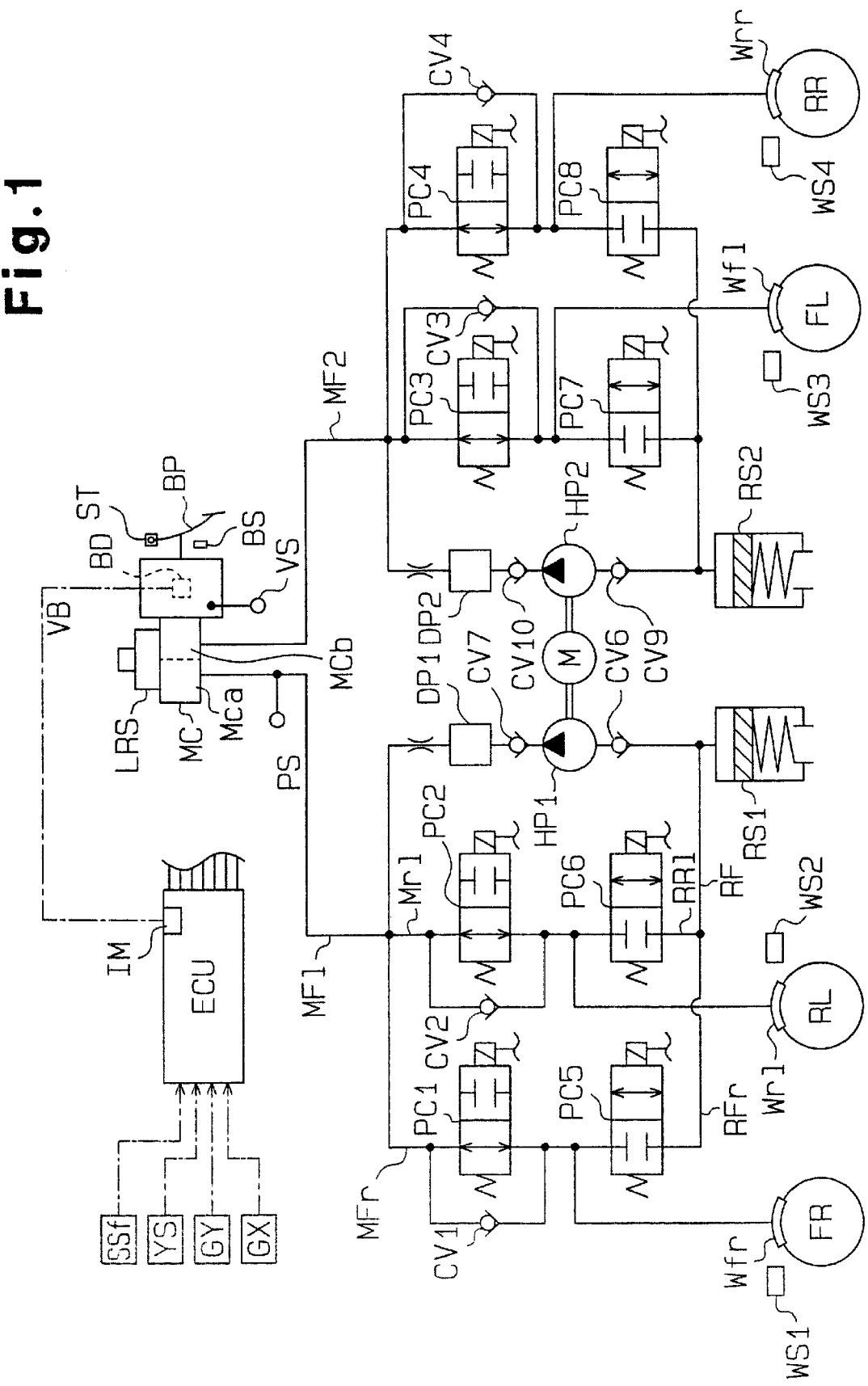
FIG. 1 is a schematic illustration of a vehicle motion control device according to an embodiment of the present invention.

Referring initially to FIG. 1, the vehicle motion control device of the present invention includes four wheels cylinders Wfl, Wfr, Wrl, Wrr operatively associated with respective wheels FL, FR, RL, RR of a front wheel drive vehicle. The wheel FL corresponds to a driving wheel which is located at front left side of the vehicle, while the wheel FR corresponds to a driving wheel on the front right side of the vehicle. The wheel RL corresponds to a driven wheel on the rear left side of the vehicle and the wheel RR corresponds to a driven wheel on the rear right side of the vehicle.

Referring to FIG. 1, a master cylinder MC is boosted via a vacuum booster VB in accordance with the operation of a brake pedal BP. The pressure of the brake fluid in a master reservoir LRS is increased to output a master cylinder hydraulic pressure to the hydraulic pressure systems or circuits on the FR, RL wheel side and the FL, RR wheel side respectively. Thus, in this described and illustrated embodiment, a so-called X-type dual circuit is utilized in the vehicle motion control device. The master cylinder MC is a tandem type master cylinder in which two pressure chambers, a first pressure chamber MCa and a second pressure chamber MCb, are connected to the respective brake hydraulic pressure systems or circuits. That is, the first pressure chamber MCa is in communication with the brake hydraulic pressure system or circuit on the FR, RL wheel side, and the second pressure chamber MCb is in communication with a brake hydraulic pressure system or circuit on the FL, RR wheel side.

Regarding the brake hydraulic pressure circuit on the FR, RL wheel side, the first pressure chamber MCa is connected to the wheel cylinders Wfr, Wrl via a main hydraulic pressure conduit MF1 and branch hydraulic pressure conduits MFr, Mrl respectively. The branch hydraulic pressure conduits MFr, Mrl are provided with a respective normally open-type two-port two-position solenoid valve PC1, PC2 (hereinafter referred as the solenoid valves PC1, PC2). In addition, a respective check valve CV1, CV2 is provided in parallel with each of the solenoid valves PC1, PC2. The check valves CV1, CV2 allow brake fluid flow only in the direction toward the master cylinder MC. Thus, brake fluid in the wheel cylinders Wfr, Wrl is returned to the master cylinder MC and eventually to the master cylinder reservoir LRS via the check valves CV1, CV2. Accordingly, when the brake pedal BP is released, the hydraulic pressure in the wheel cylinders Wfr, Wrl promptly follows the decrease of the hydraulic pressure of the master cylinder MC side. A respective normally closed-type two-port two-position solenoid valve PC5, PC6 (hereinafter referred as solenoid valves PC5, PC6) is provided on each of the output side branch hydraulic pressure conduits RFr, RR1 which are in communication with the respective wheel cylinders Wfr, Wrl. An output hydraulic pressure conduit RF connected with each of the output side branch hydraulic pressure conduits RFr, RR1 is connected with an auxiliary reservoir RS1.

The auxiliary reservoir RS1 is connected with the inlet side of a hydraulic pressure pump HP1 via the check valve CV6. The outlet side of the hydraulic pressure pump HP1 is connected to the upstream side of the solenoid valves PC1, PC2 via a check valve CV7. The hydraulic pressure pump HP1 is actuated by a single electric motor M, which also actuates another hydraulic pressure pump HP2, for introducing brake fluid from the auxiliary reservoir RSI to return to the outlet side. The auxiliary reservoir RS1 is provided independently from the master reservoir LRS of the master cylinder MC. The auxiliary reservoir RS1 may also be called an accumulator which includes a piston and a spring for preserving or accumulating a predetermined volume of the brake fluid. The check valves CV6, CV7 function as inlet and outlet valves respectively for restricting the flow of brake fluid outputted via the hydraulic pressure pump HP1 in a fixed direction. The check valves CV6, CV7 are unitarily constructed in the hydraulic pressure pump HP1. A damper DP1 is provided on the outlet side of the hydraulic pressure pump HP1.

The brake hydraulic pressure system or circuit on the FL, RR wheel side is likewise provided with normally open-type solenoid valves PC3, PC4, normally closed-type solenoid valves PC7, PC8, check valves CV3, CV4, CV9, CV10, an auxiliary reservoir RS2, and a damper DP2. As mentioned above, the hydraulic pressure pump HP2 is actuated by the same electric motor M that actuates or operates the hydraulic pressure pump HP1.

The solenoid valves PC1–PC8 for changing the brake hydraulic pressure of the wheel cylinders of the respective wheels constitute hydraulic pressure control valves of the present invention.

The vacuum booster VB includes a booster actuator BD for automatically actuating the vacuum booster VB irrespective of the operation of the brake pedal (i.e., at least when the brake pedal is not operated). The master cylinder MC, the vacuum booster VB, and the booster actuator BD constitute an automatic hydraulic pressure generator of the present invention.

A respective wheel speed sensor WS1, WS2, WS3, WS4 is provided on each of the wheels FR, RL, Fl, RR. The rotational speed of each wheel, that is a pulse signal having a pulse number proportional to the wheel speed, is inputted into an electronic control unit ECU. Further, various sensors are connected to the electronic control unit ECU. These sensors include a brake switch BS which detects the operation of the brake pedal, a stroke sensor ST constituting a stroke detecting means of the present invention which detects the stroke St of the brake pedal BP, a hydraulic pressure sensor PS constituting a hydraulic pressure detecting means which detects the master cylinder hydraulic pressure Pmc generated in the pressure chamber MCa of the master cylinder MC, a front wheel steering angle sensor SSf which detects the steering angle θf of the front wheels FL, FR, a yaw rate sensor YS which detects the yaw rate γ, a lateral G sensor GY which detects the lateral acceleration Gy of the vehicle, a longitudinal G sensor GX constituting a deceleration detecting means which detects the longitudinal acceleration (longitudinal deceleration) Gx, and a vacuum sensor VS which detects the vacuum pressure Pv of a constant pressure chamber of the vacuum booster VB. With respect to the yaw rate sensor YS, a change speed of vehicle yaw angle about the vehicle axis on the vehicle center of gravity, that is the yaw angular velocity or yaw rate, is detected and outputted as an actual yaw rate γ to the electronic control unit ECU.

The electronic control unit ECU includes an electric detecting portion IM for detecting the electric current supplied in a linear solenoid included in the booster actuator BD. The electric current detecting portion IM measures the electric voltage of the linear solenoid for converting the electric voltage into the electric current.

The electronic control unit ECU also includes a micro computer having a processing unit (CPU), various memories (ROM, RAM), and input port and output ports, all of which are interconnected via a bus. The output signals from the wheel speed sensors WS1–WS4, the stroke sensor ST, the hydraulic pressure sensor PS. the front wheel steering angle sensor SSf, the yaw rate sensor YS, the lateral G sensor GY, the longitudinal G sensor GX, and the vacuum sensor VS are inputted from the input port to the CPU via an amplifier circuit. The control signals are outputted from the output port to the hydraulic pressure control valves PC1–PC8, the hydraulic pressure pumps HP1, HP2, and the booster actuator BD via an actuating circuit. In the microcomputer, the ROM memorizes programs regarding various transactions or routines, including the program or routine shown in FIG. 3. The CPU carries out the program while an ignition switch is closed, and the RAM tentatively memorizes parameter data which is required for carrying out the program.

Figure 2:
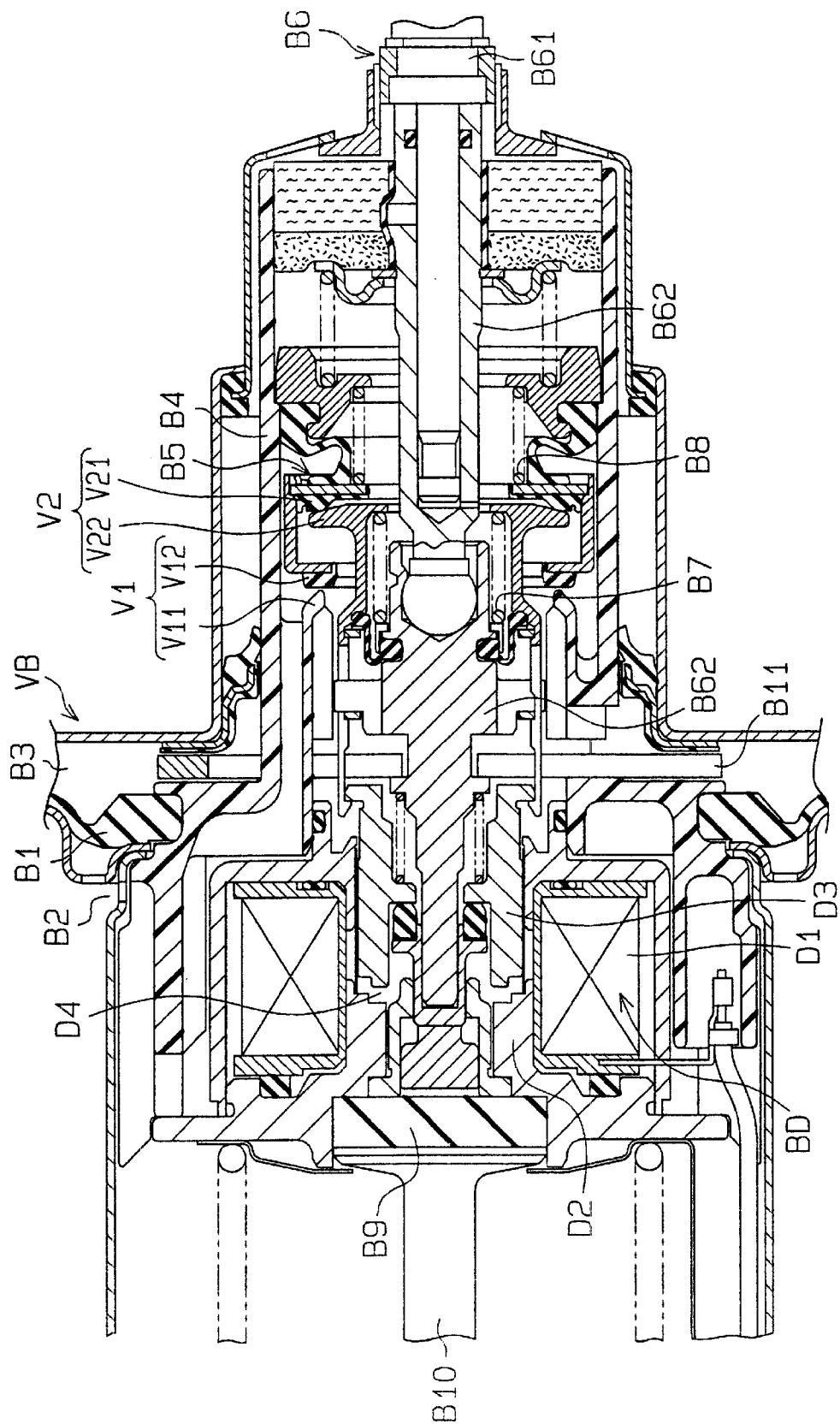
FIG. 2 is a cross-sectional view of a portion of a vacuum booster and a booster actuator used in the device shown in FIG. 1.

FIG. 2 illustrates the features associated with the vacuum booster VB and the booster actuator BD. A generally known vacuum booster VB construction is employed in the vehicle motion control device according to this embodiment of the present invention. A constant pressure chamber B2 and a variable pressure chamber B3 are formed by a movable wall B1. The movable wall B1 is connected in a unitary manner to a power piston B4. The constant pressure chamber B2 is always in communication with a negative pressure source such as the intake manifold of an engine EG so that vacuum pressure is introduced into the constant pressure chamber B2. The power piston B4 is operatively connected to an output rod B10 for transmitting the power via a fixed core D2 and a reaction disc B9. The output rod B10 is connected to the master cylinder MC.

A valve mechanism B5 is disposed in the power piston B4. The valve mechanism B5 includes a vacuum valve V1 for establishing and interrupting fluid communication between the constant pressure chamber B2 and the variable pressure chamber B3, and an air valve V2 for establishing and interrupting the fluid communication between the variable pressure chamber B3 and the atmosphere. The vacuum valve V1 includes an annular valve seat V11 formed on the power piston B4 and an elastic valve body V12 which is detachable or separable with respect to the annular valve seat V11.

The air valve V2 includes an elastic valve seat V21 equipped to or provided on the elastic valve body V12 and a valve body V22 which is detachable or separable from the elastic valve seat V21. The valve body V22 is connected to an input rod B6 which is operatively connected to the brake pedal BP. The valve body V22 is biased in the direction to be seated on the elastic valve seat 21 by the biasing force of a spring B7. The elastic valve body V12 of the vacuum valve Vi is biased in the direction to be seated on the annular valve seat V11 by the biasing force of a spring B8. The biasing force of the spring B8 also biases the elastic valve seat V21 of the air valve V2 in the direction to be seated on the valve body V22.

The vacuum valve V1 and the air valve V2 of the valve mechanism B5 are opened and closed in accordance with the operational force of the brake pedal BP to generate a differential pressure between the constant pressure chamber B2 and the variable pressure chamber B3. The output force of the brake pedal amplified by the operation of the booster is transmitted to the master cylinder MC.

The booster actuator BD includes a linear solenoid D1, the fixed core D2, and a movable core D3. The linear solenoid D1 is connected to the electronic control unit ECU and attracts the movable core D3 towards the fixed core D2 when energized. The attraction force of the linear solenoid D1 is varied in accordance with the actuating electric current. The fixed core D2 is disposed between the power piston B4 and the reaction disc B9 for transmitting the force from the power piston B4 to the reaction disc B9. The movable core D3 is positioned in opposition to the fixed core D2 in the linear solenoid D1 so that a magnetic gap D4 is formed between the movable core D3 and the fixed core D2. The movable core D3 is engaged with the valve body V22 of the air valve V2. When the movable core D3 is attracted or moved relative to the fixed core D2 in the direction to reduce the magnetic gap D4, the valve body V22 of the air valve V2 is unitarily moved with the movable core D3.

The input rod B6 includes a first input rod B61 and a second input rod B62. The first input rod B61 is unitarily connected to the brake pedal BP. The second input rod B62 is movable relative to the first input rod B61 for transmitting the force to the output rod B10 via a key member B11 by the power piston B4. Accordingly, when only the second input rod B62 is actuated to move forward, the first input rod B61 is left behind and does not move. The first and the second input rods B61, B62 are thus constructed to form a mechanism for leaving the pedal behind.

The operations of the booster actuator BD and the vacuum booster VB when performing the automatic pressure increase control (e.g., brake steering control and traction control) for automatically pressurizing the wheel cylinders of the wheels to be controlled at least when the brake pedal is not operated is as follows. When the electronic control unit ECU determines that the automatic pressure increase control is required, the linear solenoid D1 is energized and the movable core D3 moves towards the magnetic gap D4 side to reduce the gap D4. The the valve body V22 of the air valve V2 is unitarily moved together with the movable core B3 against the biasing force of the spring B7. Accordingly, the elastic valve body V12 of the vacuum valve V1 becomes seated on the annular valve seat V11 for interrupting fluid communication between the variable pressure chamber B3 and the constant pressure chamber B1. Then, with further movement of the valve body V22 of the air valve V2, the valve body V22 becomes separated from the elastic valve seat V21 and atmospheric air is introduced into the variable pressure chamber B3. Accordingly, the differential pressure is generated between the variable pressure chamber B3 and the constant pressure chamber B1 to move the power piston B4, the fixed core D2, the reaction disc B9 and the output rod B10 towards the master cylinder side. Thus, the master cylinder MC automatically generates the hydraulic pressure.

After the power piston B4 is engaged with the key member B11, the second input rod B62 engaged with the key member B11 is unitarily moved forward with the power piston B4. On the other hand, because the forward moving force of the power piston B4 is not transmitted to the first input rod B61, the first input rod B61 is maintained at its initial position. That is, when the booster actuator BD automatically actuates the vacuum booster VB, the brake pedal BP is maintained at the initial position.

Figure 3:
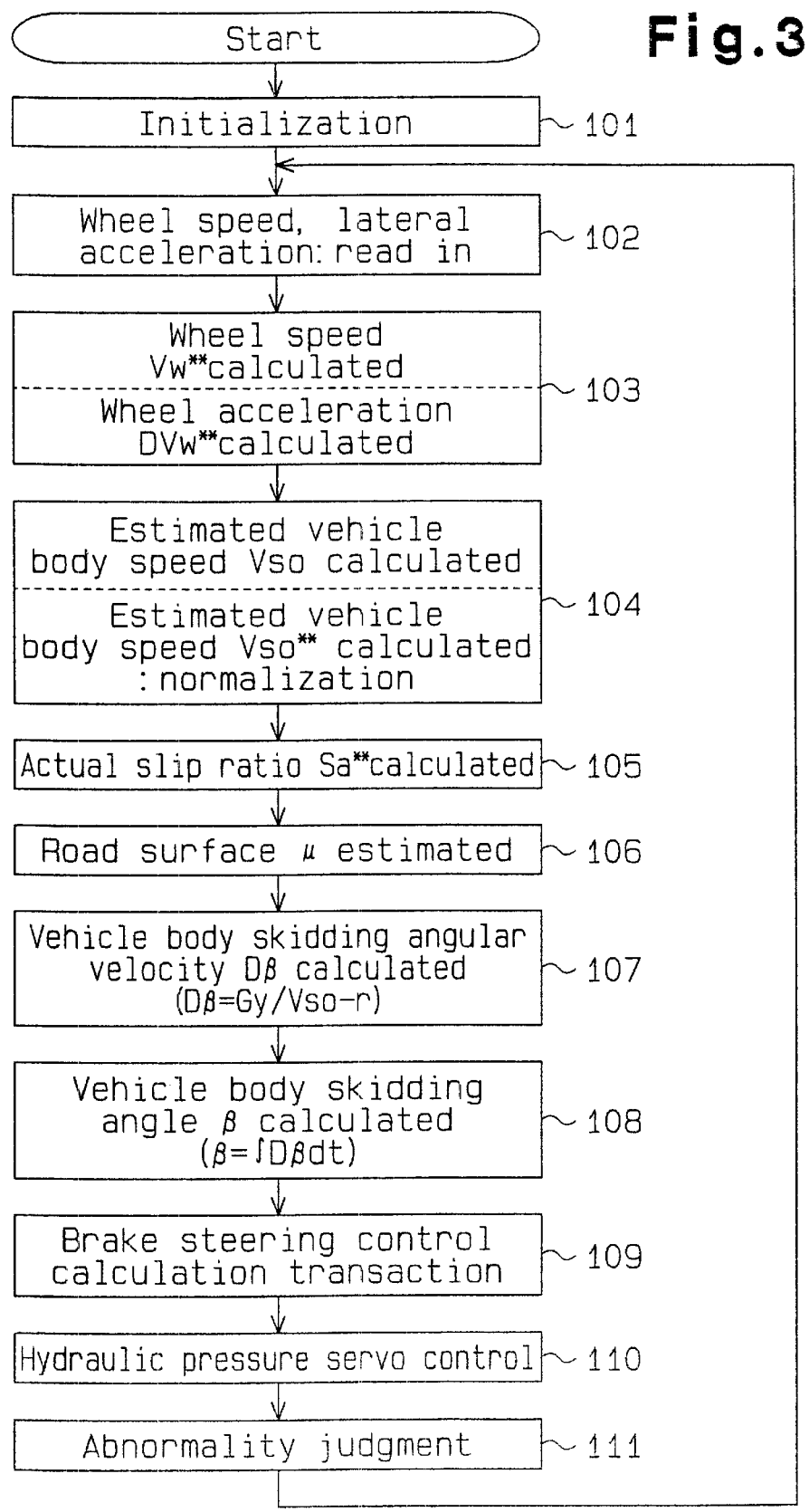
FIG. 3 is a flowchart showing the brake steering control according to the present invention.

The booster actuator BD, the solenoid valves PC1–PC8, and the electric motor M are actuated by the electronic control unit ECU for performing the brake steering control (i.e., over steer control or under steer control). When the ignition switch is closed, a program for vehicle motion control according to the flowchart of FIG. 3 is carried out, with a calculation period of, for example, every 6 ms.

In Step 101 of FIG. 1, the microcomputer is initialized to clear various calculated values. In Step 102, the detection signals of the wheel speed sensors WS1–WS4, the detection signal of the front wheel steering angle sensor SSf (i.e., the steering angle θf), the detection signal of the yaw rate sensor YS (i.e., the actual yaw rate γ), the detection signal of the lateral acceleration sensor GY (i.e., the actual lateral acceleration Gya), the detection signal of the stroke sensor BS (i.e., the stroke St of the brake pedal BP), the detection signal of the pressure sensor PS (i.e., the master cylinder hydraulic pressure Pmc), the detection signal of the vacuum sensor VS (i.e., the vacuum pressure Pv of the constant pressure chamber B2), the detection signal of the longitudinal G sensor (i.e., the longitudinal deceleration GX), and the detection signal of the electric current detecting portion (i.e., the electric current Is of the linear solenoid D1) are read in.

In Step 103, a wheel speed Vw ( identifies the particular wheel such as FR) of each wheel is calculated and a wheel acceleration DVw of each wheel is calculated by differentiating the wheel speed Vw of each wheel. Noise is removed from the wheel acceleration DVw with a filter to obtain a normalized wheel acceleration FDVw of each wheel. In Step 104, an estimated vehicle speed at the gravitational center position of the vehicle Vso (hereinafter referred to as the gravitational center position vehicle speed) is calculated based on the wheel speed Vw** of each wheel. In practice, the gravitational center position vehicle speed Vso is calculated as follows during the acceleration running or constant speed running of the vehicle.

$$Vso=\text{MIN}(Vw^{**})$$

On the other hand, the gravitational center position vehicle speed Vso is calculated during brake pedal operation (i.e., during braking) in the following manner.

$$Vso=\text{MAX}(Vw^{**})$$

Then, an estimated vehicle speed at each wheel position Vso (hereinafter referred to as each wheel position vehicle speed) is obtained. If necessary, normalization of each wheel position vehicle speed Vso is performed to reduce error due to wheel speed difference between the inner wheels and the outer wheels when the vehicle is turning. That is, the normalized vehicle speed Nvso** is calculated as follows.

$$NVso^{}=Vso^{}(n)-\Delta Vr^{**}(n)$$

In this case, ΔVr (n) corresponds to a correction coefficient for turning correction. For example, ΔVr (n) is determined as follows. That is, the correction coefficient ΔVr ( corresponds to each wheel, with FW corresponding to the front wheels and RW corresponding to the rear wheels) is determined based on a map (not shown) for each wheel, except the standardized wheel, and based on the turning radius R and γ·VsoFW (i.e., the lateral acceleration Gya). For example, when ΔVrFL is determined to be the standard, ΔVrFL is determined to be zero, ΔVrFR is determined based on a wheel speed difference map between the inner wheels and the outer wheels, ΔVrRL is determined based on a wheel difference map between the inner wheels, and ΔVrRR is determined based on a wheel speed difference map between the outer wheels and the wheel speed difference map between the inner wheels and the outer wheels.

In Step 105, an actual slip ratio Sa of each wheel is calculated in the following manner based on the wheel speed Vw and each position vehicle speed Vso obtained in Step 103 and Step 104**.

$$Sa^{}(Vso^{}-VW^{})/Vso^{}$$

In Step 106, an approximate road surface frictional coefficient μ is estimated in the following manner based on the detection signals of the longitudinal G sensor GX and the lateral acceleration sensor GY.

$$\mu=(Gx^2+Gya^2)^{1/2}$$

A road surface frictional coefficient μ may be calculated for each wheel position based on the road surface frictional coefficient μ and an estimated value of each wheel cylinder hydraulic pressure Pw. In step 107, a vehicle body skidding angular velocity Dβ is obtained as follows based on the detection signal (i.e., the actual yaw rate), the detection signal of the lateral acceleration sensor YG (i.e., the actual lateral acceleration Gy), and the gravitational center position vehicle speed Vso.

$$D\beta=GY/Vso-\gamma$$

In Step 108, a vehicle body skidding angle β is obtained in the following manner.

$$\beta=\int D\beta dt$$

In this case, the vehicle body skidding angle β corresponds to the directional angle of the vehicle relative to the running direction of the vehicle. The vehicle body skidding angular velocity Dβ corresponds to the differentiated value of the vehicle body skidding angle β (i.e., dβ/dt). The vehicle body skidding angle β may be obtained as follows based on the ratio between the vehicle speed Vx in the running direction and the vehicle speed Vy in the lateral direction which is perpendicular to the running direction.

$$\beta=\tan^{-1}(Vy/Vx)$$

In Step 109, a brake steering control calculation transaction is carried out to determine a target slip ratio for the wheels to be brake steering controlled. In Step 110, a hydraulic pressure servo control is carried out to control the solenoid valves PC1–PC8 and the linear solenoid D1 of the booster actuator BD as the need arises. After performing an abnormality judgment of the automatic hydraulic pressure generator (including VB, BD, and MC) in Step 111, the program returns to Step 102.

Figure 4:
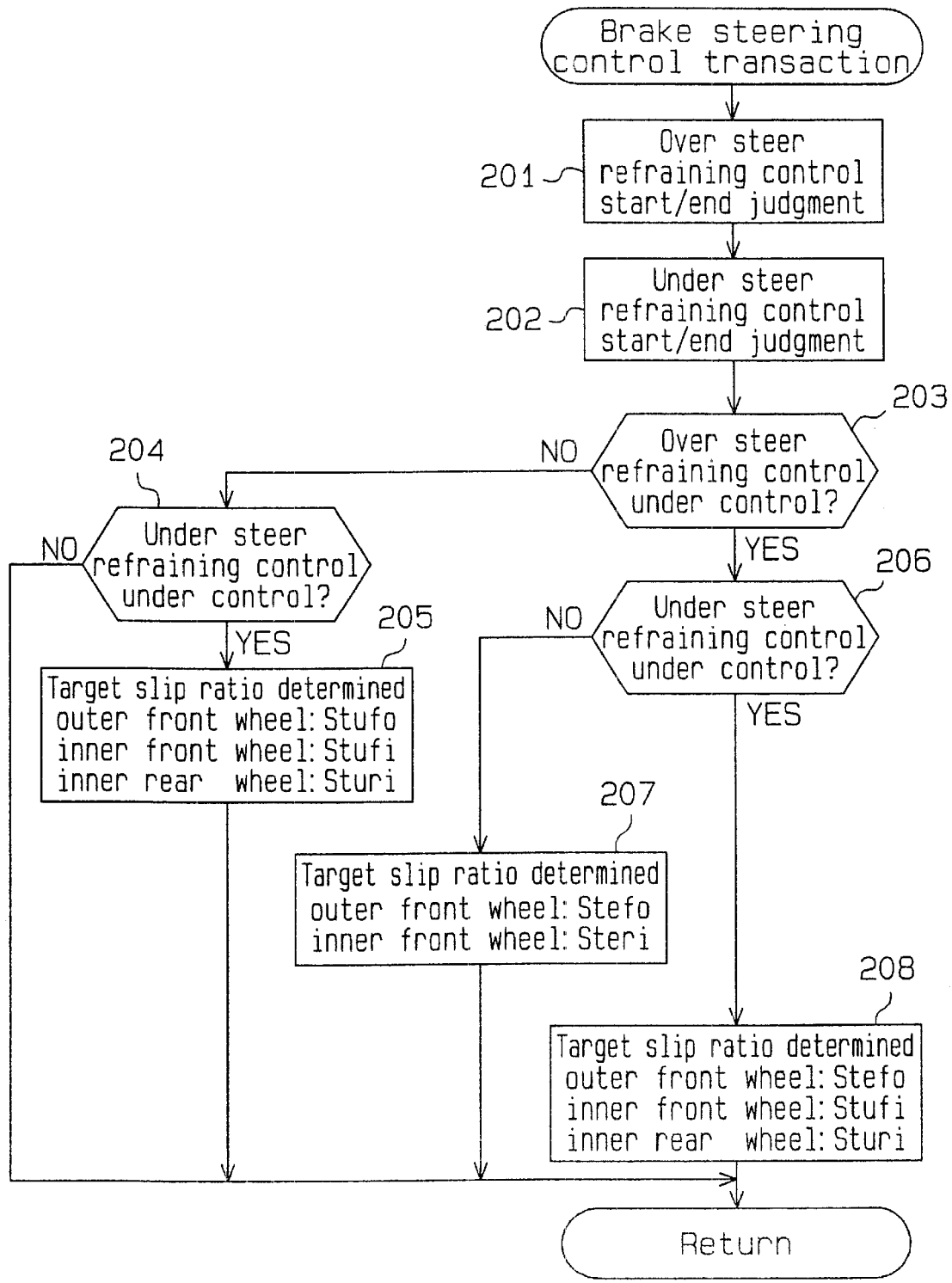
FIG. 4 is a flowchart showing the brake steering control operation carried out in the routine shown in FIG. 3.

FIG. 4 illustrates the details of the brake steering control calculation in Step 109 of FIG. 3. The brake steering control includes an oversteer refraining or restraining control and an understeer refraining or restraining control. The target slip ratio of the wheels to be controlled is determined in accordance with the oversteer refraining control and the understeer refraining control.

In Step 201 and Step 202, it is judged whether the oversteer refraining control and the understeer refraining control are started or ended respectively.

Figure 9:
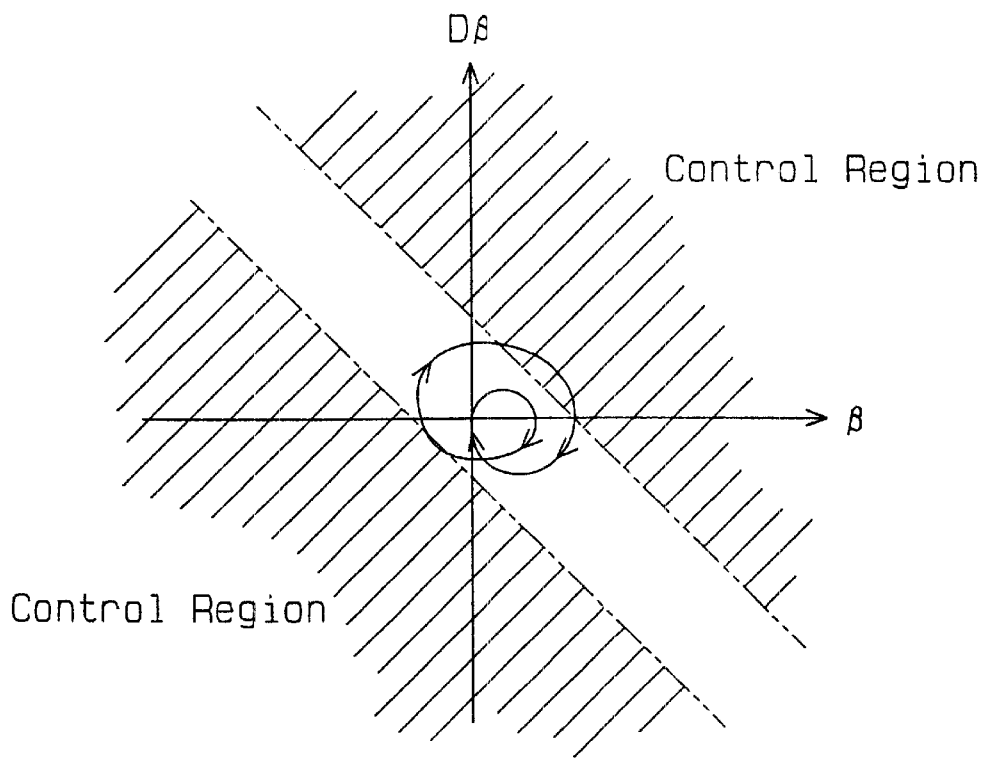
FIG. 9 is a graph showing a control region of an oversteer refraining control according to the present invention.

In Step 201, the judgment whether the over steer refraining control is started or ended is performed based on whether the relationship between the vehicle body skidding angular velocity Dβ and the vehicle body skidding angle β is in a control region indicated by the hatched area of FIG. 9. That is, when the relationship between the vehicle body skidding angular velocity Dβ and the vehicle body skidding angle β exceeds or falls outside the double dash chain line and enters the control region, the oversteer control starts. When the relationship between the vehicle body skidding angular velocity Dβ and the vehicle body skidding angle β is out of the control region, the oversteer control ends. The process of the control is shown with an arrowhead curve in FIG. 9. In this case, the more the relationship between the vehicle body skidding angular velocity Dβ and the vehicle body skidding angle β deviates from the border shown with the double dash chain line of FIG. 9 towards the control region, the larger the control amount of the braking force of each wheel becomes.

Figure 10:
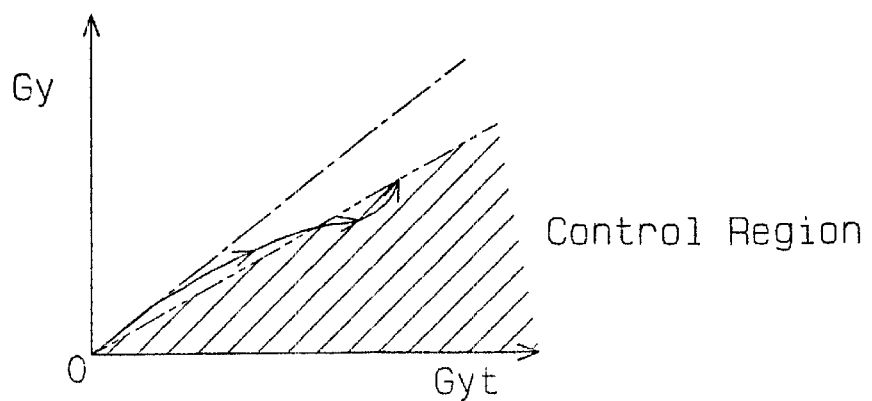
FIG. 10 is a graph showing a control region of an understeer refraining control according to the present invention.

On the other hand, whether the understeer refraining control is started or ended is judged based on whether the relationship between the actual lateral acceleration Gy and the target lateral acceleration Gyt is in the control region shown as the hatched area in FIG. 10. That is, when the relationship between the actual lateral acceleration Gy and the target lateral acceleration Gyt deviates from an ideal line represented by the dashed line and enters the control region in accordance with the variation of the actual lateral acceleration Gy relative to the target lateral acceleration Gyt at the judgment, the understeer refraining control starts. When the relationship between the actual lateral acceleration Gy and the target lateral acceleration Gyt deviates from the control region, it is determined that the understeer refraining control is ended as shown by the arrowhead curve in FIG. 10.

In Step 203, it is determined whether the oversteer refraining control is under control. When the over steer refraining control is not under control, it is judged whether the understeer refraining control is under control in Step 204. When it is determined in Step 204 that the understeer refraining control is not under control, the program returns to the main routine of FIG. 3. When it is judged in Step 204 that the understeer refraining control is under control, the program advances to Step 205. In Step 205, the inner rear wheel with respect to the turning and the front wheels are selected, and respective target slip ratios at the understeer refraining control are determined to be Sturi, Stufo, and Stufi respectively. The designations included with the slip ratio (S) include "t" which stands for the target which is compared with "a" showing an actual measurement, "u" which stands for the understeer refraining control, "f" which stands for the front wheel, "r" which stands for the rear wheel, "o" which stands for outer, and "i" which stands for inner.

In order to determine the target slip ratio, the difference between the target lateral acceleration Gyt and the actual lateral acceleration Gy is employed. The target lateral acceleration Gyt is obtained based on the following equation.

$$Gyt = \gamma(\theta f) \cdot Vso$$

In this case, the value γ (θf) is obtained using the following equation.

$$\gamma(\theta f) = \{(\theta f/N) \cdot L\} \cdot Vso/(1 + Kh \cdot Vso2)$$

Kh represents a stability factor, N stands for the steering gear ratio, and L stands for the wheel base. The target slip ratio for the understeer refraining control is determined as follows based on the deviation between the target lateral acceleration Gyt and the actual lateral acceleration Gy.

$$Stufo = K5 \cdot \Delta Gy$$

$$Stufi = K6 \cdot \Delta Gy$$

$$Sturi = K7 \cdot \Delta Gy$$

The constant K5 is determined to be a value for performing the control for pressure increase (or pressure decrease). The constant K6 and the constant K7 are determined to be a value for performing the control for pressure increase.

When it is determined in Step 203 that the oversteer refraining control is under control, the program proceeds to Step 206. In Step 206 it is determined whether the understeer refraining control is under control. When it is determined in Step 206 that the understeer refraining control is not under control, the program advances to Step 207. In Step 207, the outer front wheel with respect to the turning and the inner rear wheel with respect to the turning are selected, and the target slip ratios of those wheels are determined to be Stefo and Steri (=O) respectively. In this case, "e" stands for oversteer refraining control.

To determine the target slip ratios for oversteer, the vehicle body skidding angle β and the vehicle body skidding angular velocity Dβ are employed, and the target slip ratios are determined in the following manner.

$$Stefo = K1 \cdot \beta + K2 \cdot D\beta$$

$$Steri = K3 \cdot \beta + K4 \cdot D\beta$$

In this case, K1–K4 are constants. The target slip ratio Stefo of the outer front wheel with respect to turning is determined to be a value for performing the control in the direction to increase the braking force. The target slip ratio Steri of the inner side wheel with respect to turning is determined to be a value to perform the control in the direction for reducing the braking force. Accordingly, when the brake pedal is not under operation, the target slip ratio Steri is determined to be zero (i.e., Steri=0). In this case, the constants KI–K4 are determined as follows.

$$K3 \leq K1/5$$

$$K4 \leq K2/5$$

When it is determined in Step 206 that the understeer refraining control is under control, the transaction advances to Step 208. In Step 208, the target slip ratio of the outer front wheel with respect to turning is determined to be Stefo for the oversteer refraining control and the target slip ratio of the inner wheels with respect to turning are determined to be Sturi and Stufi respectively for the understeer refraining control. That is, when the oversteer refraining control and the understeer refraining control are performed simultaneously, the outer front wheel with respect to turning is determined like the target slip ratio of the oversteer refraining control, and the inner wheels at turning are determined like the target slip ratio of the understeer refraining control.

Because the outer rear wheel with respect to turning (i.e., a driven wheel in a front wheel drive vehicle) is used for calculating the gravitational center position vehicle speed Vso, the outer rear wheel with respect to turning is not selected as an object of the control in both the understeer refraining control and the oversteer refraining control.

Figure 5:
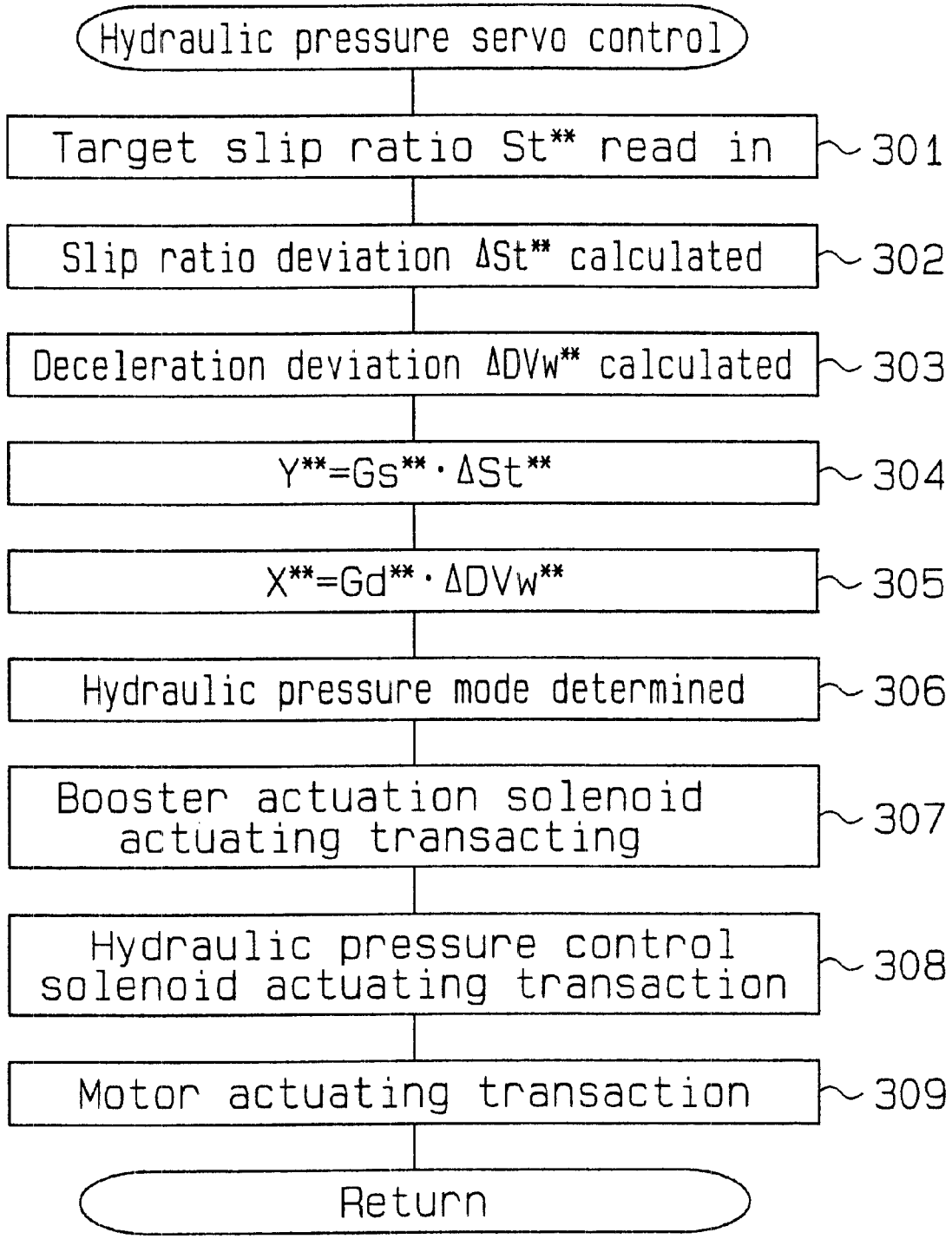
FIG. 5 is a flowchart showing the hydraulic pressure servo control operation carried out in the routine shown in FIG. 3.

The details associated with the hydraulic pressure servo control in Step 110 of FIG. 3 are illustrated in FIG. 5. A slip ratio servo control of the wheel cylinder hydraulic pressure is performed on the controlled wheels. In Step 301, the target slip ratio St of each wheel to be subjected to brake steering control which is determined in Steps 205, 207 and 208 of FIG. 4 is read in. In Step 302, a slip ratio deviation ΔSt of each wheel is calculated. In practice, the difference between the target slip ratio St and the actual slip ratio Sa of each wheel is calculated in the following manner.

$$\Delta St^{} = St^{} - Sa^{**}$$

In Step 303, a deceleration deviation ΔDVw is calculated. The difference between the longitudinal vehicle deceleration Gx measured by the longitudinal G sensor Gx and the wheel deceleration DVw of each wheel is calculated to obtain the deceleration deviation ΔDVw** as follows.

$$\Delta DVw^{} = Gx - DVw^{}$$

In Step 304, a parameter Y** for the brake hydraulic pressure control is calculated in the following manner.

$$Y^{} = Gs^{} \cdot \Delta St^{**} \quad (Gs: \text{constant})$$

In Step 305, another parameter X** for the brake hydraulic pressure control is calculated in the following manner.

$$X^{} = Gd^{} \cdot \Delta DVw^{} \quad (Gd^{}: \text{constant})$$

Figure 11:
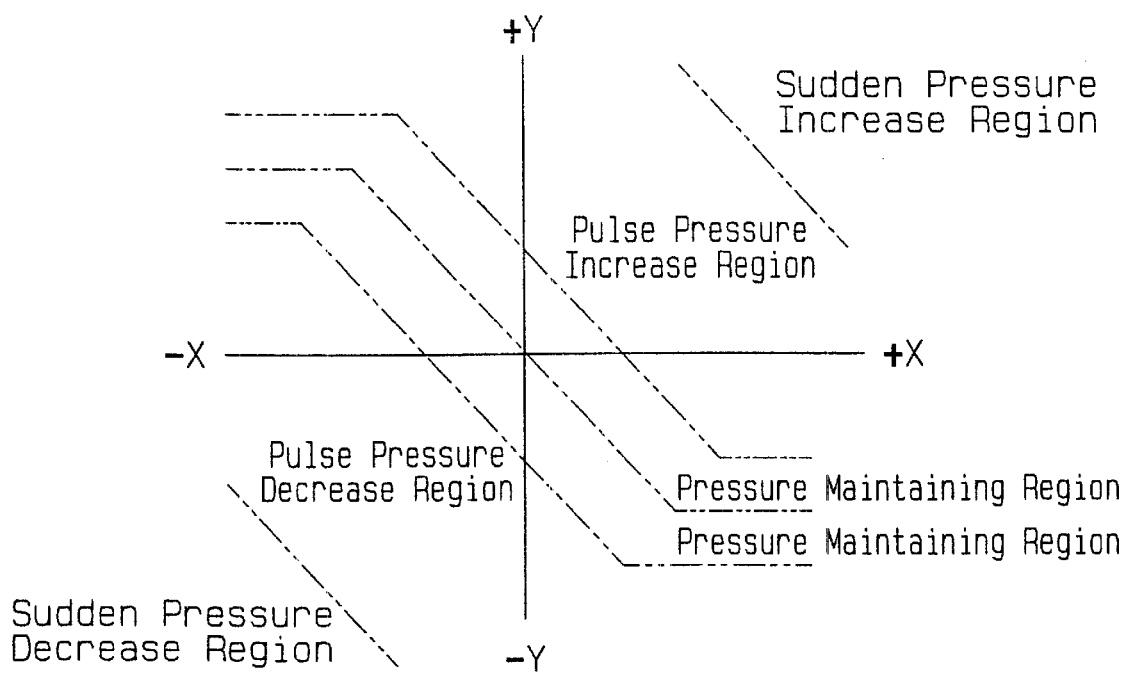
FIG. 11 is a graph showing the relationship between a parameter for a brake hydraulic pressure control and a hydraulic pressure mode.

In Step 306, a hydraulic pressure mode of each wheel is determined according to the hydraulic pressure control map shown in FIG. 11 based on the parameters X and Y. As shown in FIG. 11, the hydraulic pressure control map has a sudden pressure decrease region, a pulse pressure decrease region, a pressure maintaining region, a pulse pressure increase region, and a sudden pressure increase region. In Step 306, it is determined which hydraulic pressure mode identified with each region is applied to each wheel in accordance with the parameter X and the parameter Y. Regarding the pulse pressure increase mode and the pulse pressure decrease mode, a duty (i.e., ratio of increasing pressure output time and decreasing pressure output time in a cycle) for a hydraulic pressure control valve actuation is determined. In the pulse pressure increase mode, the closer to the sudden pressure increase side of FIG. 11, the larger the duty becomes. In the pulse pressure decrease mode, the closer to the sudden pressure decrease side of FIG. 11, the larger the duty becomes. The hydraulic pressure control mode is not determined when the brake steering control is not under control (i.e., when all solenoids are OFF).

In Step 307, the, linear solenoid D1 for the booster actuation is actuated. Then in Step 308, the solenoid PC* which are the hydraulic pressure control valves are controlled in accordance with the hydraulic pressure mode and the duty determined in Step 306 to increase, maintain, or decrease the brake hydraulic pressure of the wheel cylinder. In Step 309, the motor M is actuated. The motor M is fully energized when the brake steering control is carried out.

Figure 6:
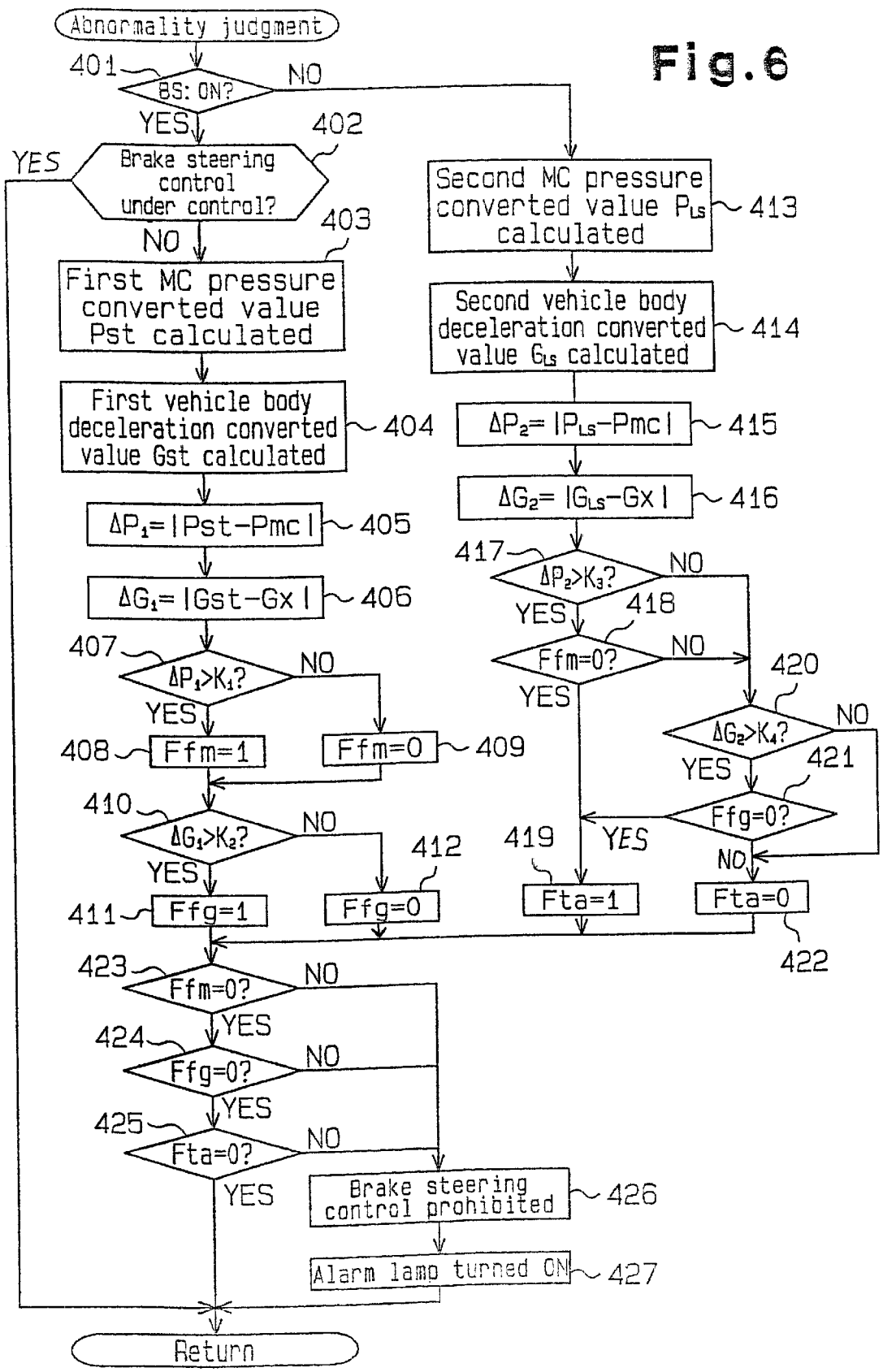
FIG. 6 is a flowchart showing the abnormality judgment operation carried out in the routine shown in FIG. 3.

Referring to FIG. 6, the abnormality judgment of FIG. 3 is carried out in the following manner. In Step 401, it is determined whether the brake switch BS is ON, that is whether the brake pedal BP is under operation or is depressed. When the brake switch BS is ON, the program advances to Step 402 to judge whether the brake steering control is under control. When it is determined that the brake steering control is not under control, the program advances to Step 403. In Step 403, the stroke St of the brake pedal BP indicated by the detection signal of the stroke sensor ST is converted into the master cylinder hydraulic pressure using a predetermined map (not shown) to calculate a first master cylinder hydraulic pressure converted value Pst. In Step 404, the stroke St of the brake pedal BP is converted into the vehicle body deceleration using the predetermined map to calculate a first vehicle body deceleration converted value Gst. In Step 405, a difference ΔP1 between the first master cylinder hydraulic pressure converted value Pst and the master cylinder hydraulic pressure Pmc which corresponds to the detection signal of the hydraulic pressure sensor PS is calculated. In Step 406, the difference ΔG1 between the first vehicle body deceleration converted value Gst and the longitudinal vehicle deceleration Gx based on the detection signal of the longitudinal G sensor is calculated.

In Step 407, the difference ΔP1 between the first master cylinder hydraulic pressure converted value Pst and the master cylinder hydraulic pressure Pmc is compared with a predetermined value k1. When the difference ΔPl is greater than the predetermined value k1, an abnormality flag Ffm indicating an abnormality of the hydraulic pressure sensor PS (hereinafter referred as the hydraulic pressure sensor abnormality flag Ffm) is set to one (1) in Step 408. When the difference ΔP1 is less than the predetermined value k1, the hydraulic pressure sensor abnormality flag Ffm is set to zero (0) in Step 409. As shown above, when the difference ΔP1 between the first master cylinder hydraulic pressure converted value Pst and the detected master cylinder hydraulic pressure Pmc is greater than the predetermined value k1, the hydraulic pressure sensor PS is determined to be abnormal. When the difference ΔP1 between the first master cylinder hydraulic pressure converted value Pst and the detected master cylinder hydraulic pressure Pmc is less than the predetermined value k1, the hydraulic pressure sensor PS is judged to be normal.

After carrying out Step 408 and Step 409, the program advances to Step 410. In Step 410, the difference ΔG1 between the first vehicle body deceleration converted value Gst and the detected longitudinal vehicle deceleration Gx is compared with a predetermined value k2. When the difference ΔG1 is greater than the predetermined value k2, an abnormality flag Ffg indicating an abnormality of the longitudinal G sensor Gx (hereinafter referred as the longitudinal G sensor abnormality flag) Ffg is set to one (1) in Step 411. When the difference ΔG1 is less than the predetermined value k2, the longitudinal G sensor abnormality flag Ffg is set to zero (0) in Step 412. Accordingly, when the difference ΔG1 between the first vehicle body deceleration converted value Gst and the longitudinal vehicle deceleration Gx is greater than the predetermined value k2, it is determined that the longitudinal C sensor GX is performing abnormally. When the difference ΔG1 is less than the predetermined value k2, it is determined that the longitudinal G sensor GX is performing normally.

When it is determined in Step 401 that the brake switch BS is OFF, that is when it is judged that the brake pedal is not under operation, the program advances to Step 413. In Step 413, the electric current Is flowing in the linear solenoid D1 (hereinafter referred to as the solenoid electric current Is) and detected by the electric current detecting portion IM is converted into the master cylinder hydraulic pressure to calculate a second master cylinder hydraulic pressure converted value PLS.

Figure 7:
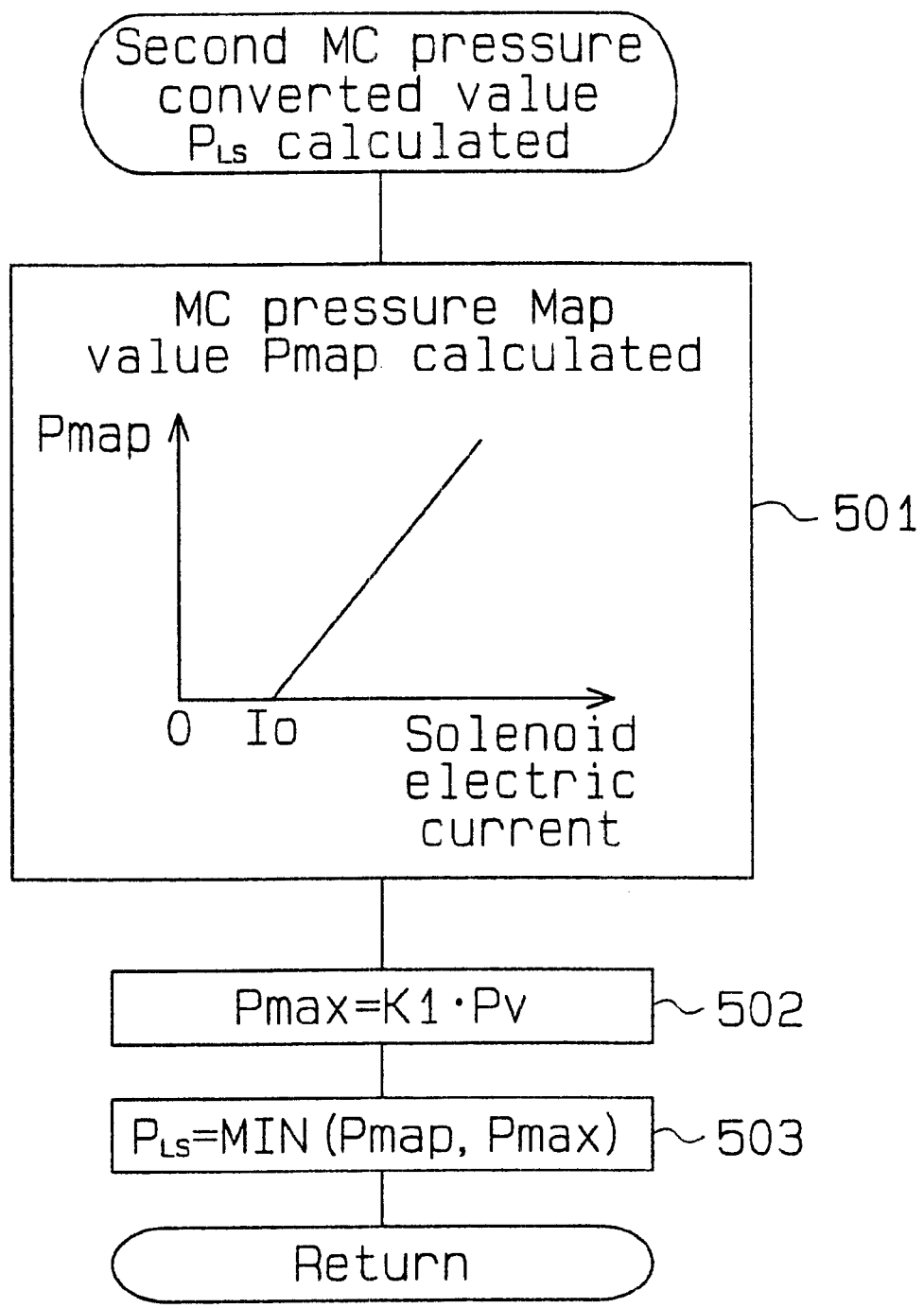
FIG. 7 is a flowchart showing the calculation of a second master cylinder hydraulic pressure value that is carried out in FIG. 6.

Referring to FIG. 7, the calculation of the second master cylinder hydraulic pressure converted value PLS is carried out in the following manner. In Step 501, a master cylinder hydraulic pressure map value Pmap is calculated based on the solenoid electric current Is using the map shown in Step 501. According to the map, the master cylinder hydraulic pressure map value Pmap is determined to be zero (0) when the solenoid electric current Is is less than a predetermined electric current IO. When the solenoid electric current Is is greater than the predetermined electric current IO, the master cylinder hydraulic pressure map value Pmap increases proportionally to the increase of the solenoid electric current Is. In this case, the predetermined electric current IO corresponds to the minimum electric current necessary to open the air valve V2. In Step 502, a master cylinder hydraulic pressure maximum value Pmax is calculated as follows based on the vacuum pressure Pv in the constant pressure chamber B2 detected by the vacuum sensor VS.

$Pmax = K1 \cdot Pv$ ($K1$ corresponds to a positive proportionality constant)

That is, the smaller the vacuum pressure Pv of the constant pressure chamber B2 (i.e., the less the differential pressure between the constant pressure chamber B2 and the variable pressure chamber B3), the smaller the pressure of the determined master cylinder hydraulic pressure maximum value Pmax. In Step 503, the second master cylinder hydraulic pressure converted value PLS is determined to be the smallest value among the master cylinder hydraulic pressure map value Pmap and the master cylinder hydraulic pressure maximum value Pmax.

Referring back to FIG. 6, after the calculation of the second master cylinder hydraulic pressure converted value PLS in Step 413, the program advances to Step 414. In Step 414, the second master cylinder hydraulic pressure converted value PLS is converted into the vehicle body deceleration to calculate a second vehicle body deceleration converted value GLS.

Figure 8:
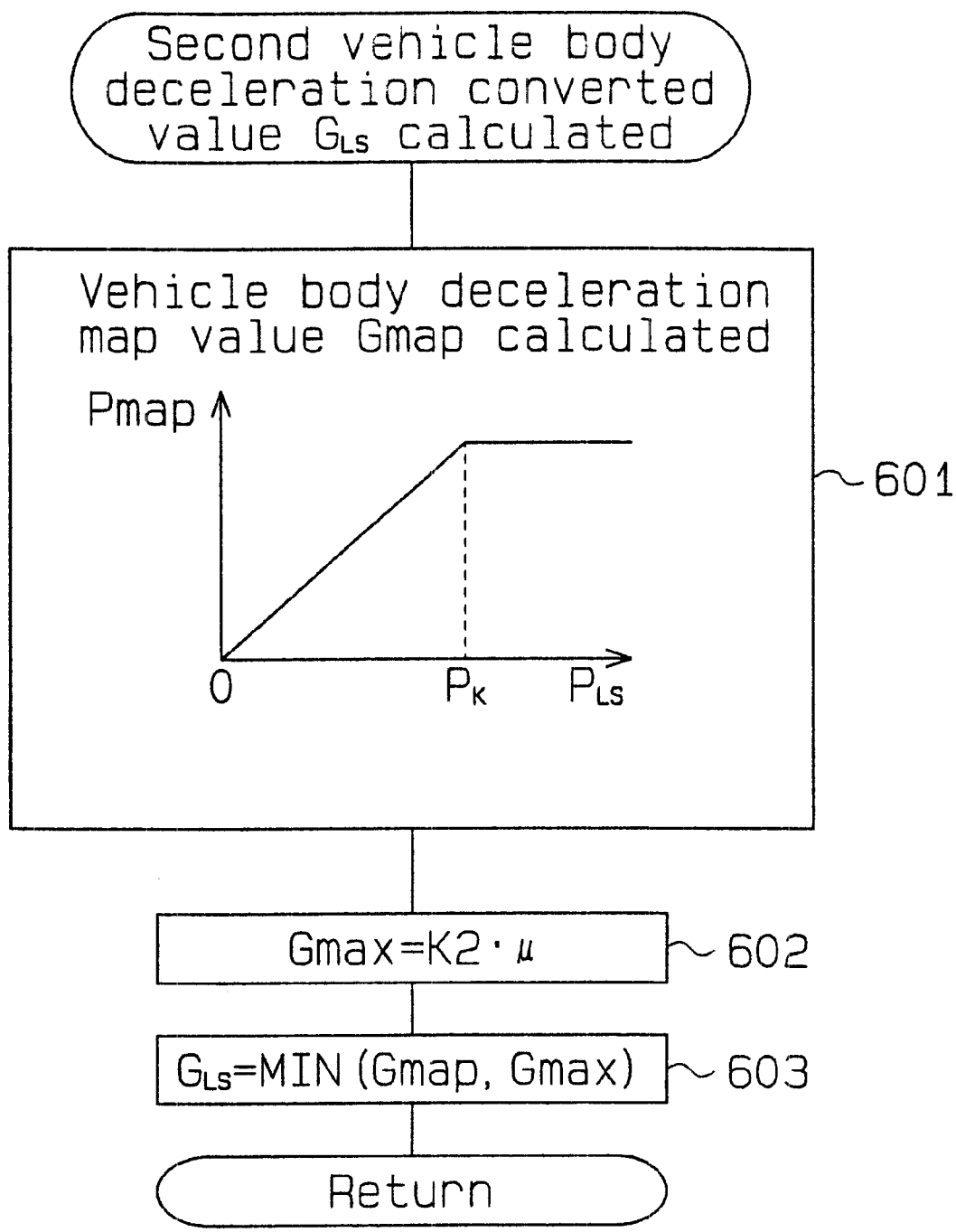
FIG. 8 is a flowchart showing the calculation of a second vehicle body deceleration that is carried out in FIG. 6.

FIG. 8 illustrates the details associated with calculating the second vehicle deceleration converted value GKS. In Step 601 of FIG. 8, a vehicle deceleration map Gmap is calculated based on the second master cylinder hydraulic pressure converted value PLS using the map shown in Step 601. According to this map, the vehicle deceleration map value Gmap is determined to increase proportionally to the increase of the second master cylinder hydraulic pressure converted value PLS when the master cylinder hydraulic pressure converted value PLS is within a range between zero (0) to a predetermined value Pk. When the second master cylinder hydraulic pressure converted value PLS is greater than the predetermined value Pk, the vehicle deceleration map value Gmap maintains a predetermined maximum value. In Step 602, a vehicle body deceleration maximum value Gmax is calculated in the following manner based on the road surface $\mu$ estimated in Step 106 of FIG., 3.

$Gmax = K2 \cdot \mu$ ($K2$ corresponds to a positive proportionality constant which converts the units)

That is, as the road surface $\mu$ becomes lower, the vehicle body deceleration maximum value Gmax is determined to be smaller. In Step 603, the second vehicle body deceleration converted value GLS is determined to be the smallest value among the vehicle body deceleration map value Gmap and the vehicle body deceleration maximum value Gmax. Although the vehicle deceleration value is obtained by converting the second master cylinder hydraulic pressure converted value PLS to the vehicle body deceleration in this embodiment, the solenoid electric current Is may be converted into the vehicle deceleration without using the second master cylinder hydraulic pressure converted value PLS.

After the calculation of the second vehicle deceleration converted value GLS in Step 414 of FIG. 6, the program advances to Step 415. Here, the difference $\Delta P2$ between the second master cylinder hydraulic pressure converted value PLS and the master cylinder hydraulic pressure Pmc detected by the hydraulic pressure sensor PS is calculated. In step 416, the difference $\Delta G2$ between the second vehicle body deceleration converted value GLS and the detected longitudinal vehicle body deceleration Gx is calculated.

In Step 417, the difference $\Delta P2$ between the second master cylinder hydraulic pressure converted value PLS and the master cylinder hydraulic pressure Pmc is compared with a predetermined value k3. When the difference $\Delta P2$ is greater than the predetermined value k3, it is determined in Step 418 whether the hydraulic pressure sensor abnormality flag Ffm is set to zero (0). That is, it is determined whether the memorized performance of the hydraulic pressure sensor PS judged at the hydraulic pressure sensor abnormality judgment in Steps 407–409 is normal. When it is memorized that the performance of the hydraulic pressure sensor is normal, the program advances to Step 419. In step 419, a flag Hfa indicating an abnormality of at least one of the booster actuator BD, the vacuum booster VB, and the master cylinder MC (hereinafter referred as an automatic hydraulic pressure abnormality flag Ffa) is set to one (1). The abnormality of the automatic hydraulic pressure generator includes breakage and short-circuiting of the linear solenoid D1, failure of the vacuum booster VB, and a defect in the valve mechanisms V1, V2.

When it is determined in Step 417 that the difference $\Delta P2$ between the second master cylinder hydraulic pressure converted value PLS and the master cylinder hydraulic pressure Pmc is less than the predetermined value k3, and when it is determined in Step 418 that the hydraulic pressure flag Ffm is memorized to be one (1), the program advances to Step 420. In step 420, the difference $\Delta G2$ between the second vehicle body deceleration converted value GLS and the detected longitudinal vehicle body deceleration Gx is compared with a predetermined value k4. When the difference $\Delta G2$ is greater than the predetermined value k4, it is determined in Step 421 whether the longitudinal G sensor abnormality flag Ffg is set to zero (0). That is, it is determined whether the memorized performance of the longitudinal G sensor GX judged at the longitudinal G sensor abnormality judgment of Steps 410–412 is normal. When the memorized performance of the longitudinal G sensor GX is normal, the program advances to Step 419 to set the automatic hydraulic pressure abnormality flag Fta to one (1).

On the other hand, when it is determined in Step 420 that the difference $\Delta G2$ between the second vehicle body deceleration converted value GLS and the detected longitudinal vehicle body deceleration Gx is less than the predetermined value k4, and when it is determined in Step 421 that the longitudinal G sensor abnormality flag Ffg is memorized as one (1), the program advances to Step 422. In Step 422, the automatic hydraulic pressure abnormality flag fta is set to zero (0).

Thus, when the difference ΔP2 between the second master cylinder. hydraulic pressure converted value PLS, calculated based on the electric current of the linear solenoid D1 and the vacuum pressure Pv of the constant pressure chamber B2, and the detected master cylinder hydraulic pressure Pmc is greater than the predetermined value k3 and when also the hydraulic pressure sensor PS is judged and memorized as being normal, it is judged that the linear solenoid D1 is abnormal. When the difference ΔG2 between the second vehicle body deceleration converted value GLS, calculated based on the electric current of the linear solenoid D1 and the detected longitudinal vehicle body deceleration Gx, is greater than the predetermined value k4 and when the performance of longitudinal G sensor GX is judged and memorized as being normal, it is determined that the performance of the linear solenoid D1 is abnormal.

After carrying out Steps 411, 412, 419 or 422, the program advances to Step 423. Here it is determined whether the hydraulic pressure sensor abnormality flag Ffm is zero (0). When it is determined that the hydraulic pressure sensor abnormality flag Ffm is zero (0), it is then determined in Step 424 whether the longitudinal G sensor abnormality flag Ffg is zero (0). When it is determined in Step 424 that the longitudinal G sensor abnormality flag Ffg is zero (0), it is then judged in Step 425 whether the automatic hydraulic pressure abnormality flag Ffa is zero (0). When the automatic hydraulic pressure abnormality flag Ffa is zero (0), the program returns to the main routine of FIG. 3. On the other hand, when it is determined in Steps 423–425 that one of the abnormality flags Ffm, Ffg, Fta is set to one (1) (i.e., at least one of the pressure sensor PS, the longitudinal G sensor GX, and the linear solenoid D1 is abnormal), the brake steering control is prohibited in Step 426 and an alarm lamp is turned on in Step 427 for providing an alarm.

When it is judged that the brake steering control is under operation in Step 402, the program returns to the main routine of FIG. 3. That is, the abnormality judgment is not carried out when the brake steering control is under operation.

In the above-described embodiment of the present invention, the automatic hydraulic pressure generator is constructed to include the master cylinder MC, the vacuum booster VB, and the booster actuator BD in order to detect the abnormality of the booster actuator BD. However, the vehicle motion control device of the present invention is applicable to other constructions. The automatic hydraulic pressure generator may be constructed with a master cylinder, a hydraulic pressure booster for boosting the operation of the master cylinder by the hydraulic pressure, and a booster actuator (e.g., solenoid valve) for actuating the hydraulic pressure booster irrespective of the operation of the brake pedal in order to detect the abnormality of the booster actuator based on the variable state of the booster actuator.

In addition, although the disclosed embodiment of the present invention is explained in connection with brake steering control, it is to be understood that the vehicle motion control device of the present invention is applicable to other automatic control for pressurizing the wheel cylinder irrespective of the brake pedal operation such as the transaction control and the roll over prevention control.

The vehicle motion control device according to the described embodiment of the present invention utilizes a stroke sensor ST, other sensors for detecting the operational amount of the brake pedal, such as a stepping force sensor for detecting the stepping force of the brake pedal BP, may be employed.

With respect to the deceleration detecting means of the present invention, a G sensor for detecting the longitudinal deceleration of the vehicle and a deceleration-estimating device for calculating an estimated vehicle speed using a detection signal of a wheel speed sensor and for obtaining ah estimated vehicle deceleration by differentiating the estimated vehicle speed may be employed.

According to the vehicle motion control device of this embodiment, the abnormality of the automatic hydraulic pressure generator can be detected and the program control can be performed appropriately when the abnormality is detected. Also, the abnormality of the automatic hydraulic pressure generator can be detected with a relatively simple structure.

The vehicle motion control device of the disclosed embodiment is designed so that the abnormality of the automatic hydraulic pressure generator is judged only when a hydraulic pressure detecting means which is used for judging the abnormality of the automatic hydraulic pressure generator is judged and memorized to be normal. Thus, the abnormality of the automatic hydraulic pressure generator can be accurately detected.

In addition, the vehicle motion control device judges the abnormality of the automatic hydraulic pressure generator only when a deceleration detecting means which is used for judging the abnormality of the automatic hydraulic pressure generator is judged and memorized to be normal. This also allows the abnormality of the automatic hydraulic pressure generator to be accurately detected.

The vehicle motion control device is constructed so that the automatic pressure increase control is prohibited from being performed when the abnormality of the automatic hydraulic pressure generator is detected. It can thus possible to prevent the automatic pressure increase control from being carried out inappropriately.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the part and scope of the preset invention as defined in the claims, be embraced thereby.

What is claimed is:

1. A vehicle motion control device comprising:
    a wheel cylinder equipped on a vehicle wheel for providing a braking torque;
    an automatic hydraulic pressure generator including a master cylinder, a booster and a booster actuator, the master cylinder supplying a master cylinder hydraulic pressure to the wheel cylinder, the booster boosting actuation of the master cylinder in accordance with operation of a brake pedal, and the booster actuator actuating the booster irrespective of the operation of the brake pedal and generating the master cylinder hydraulic pressure in the master cylinder;
    a hydraulic pressure control valve disposed between the automatic hydraulic pressure generator and the wheel cylinder for controlling a brake hydraulic pressure of the wheel cylinder;
    control means for controlling the booster actuator of the automatic hydraulic pressure generator and the hydraulic pressure control valve in accordance with a running condition of the vehicle and for performing an automatic pressure increase control to the wheel cylinder;

abnormality detecting means for detecting an abnormality of the automatic hydraulic pressure generator;

abnormality transaction means for performing a predetermined transaction with respect to the automatic pressure increase control by the control means when the abnormality detecting means detects the abnormality of the automatic hydraulic pressure generator;

variable state detecting means for detecting a variable state of the booster actuator;

hydraulic pressure detecting means for detecting the master cylinder hydraulic pressure;

the abnormality detecting means calculating the master cylinder hydraulic pressure based on the variable state detected by the variable state detecting means when the brake pedal is not under operation and detecting the abnormality of the automatic hydraulic pressure generator by comparing the calculated master cylinder hydraulic pressure with the master cylinder hydraulic pressure detected by the hydraulic pressure detecting means.

2. The vehicle motion control device according to claim 1, further comprising:

stroke detecting means for detecting a stroke of the brake pedal;

the abnormality detecting means judging and memorizing whether the hydraulic pressure detecting means is normally operated based on a detected result of the stroke detecting means and the master cylinder hydraulic pressure detected by the hydraulic pressure detecting means when the brake pedal is under operation, and wherein when a difference between the calculated master cylinder hydraulic pressure and the master cylinder hydraulic pressure detected by the hydraulic pressure detecting means is greater than a predetermined value and when it is memorized that operation of the hydraulic pressure detecting means is normal when the brake pedal is not under operation, the abnormality detecting means judges that the automatic hydraulic pressure generator is abnormal.

3. The vehicle motion control device according to claim 1, wherein the booster is a vacuum booster comprising;

a movable wall;

a constant pressure chamber formed forwardly of the movable wall and into which vacuum pressure is introduced;

a variable pressure chamber formed rearwardly of the movable wall for selectively communicating with the constant pressure chamber and with atmospheric air; and a valve mechanism for establishing and interrupting communication between the constant pressure chamber and the variable pressure chamber and for establishing and interrupting communication between the variable pressure chamber and the atmosphere, the booster actuator comprising:

a linear solenoid disposed in the vacuum booster for actuating the valve mechanism through energization of the solenoid irrespective of the brake pedal operation and for controlling the valve mechanism in accordance with an amount of energization of the solenoid; and the variable state detecting means detecting an electric current of the linear solenoid as the variable state of the booster actuator.

4. A vehicle motion control device comprising:

a wheel cylinder equipped on a vehicle wheel for providing a braking torque;

an automatic hydraulic pressure generator including a master cylinder, a booster and a booster actuator the master cylinder supplying a master cylinder hydraulic pressure to the wheel cylinder, the booster boosting actuation of the master cylinder in accordance with operation of a brake pedal, and the booster actuator actuating the booster irrespective of the operation of the brake pedal and generating the master cylinder hydraulic pressure in the master cylinder:

a hydraulic pressure control valve disposed between the automatic hydraulic pressure generator and the wheel cylinder for controlling a brake hydraulic pressure of the wheel cylinder:

control means for controlling the booster actuator of the automatic hydraulic pressure generator and the hydraulic pressure control valve in accordance with a running condition of the vehicle and for performing an automatic pressure increase control to the wheel cylinder;

abnormality detecting means for detecting an abnormality of the automatic hydraulic pressure generator;

abnormality transaction means for performing a predetermined transaction with respect to the automatic pressure increase control by the control means when the abnormality detecting means detects the abnormality of the automatic hydraulic pressure generator;

variable state detecting means for detecting a variable state of the booster actuator; and deceleration detecting means for detecting or estimating a vehicle deceleration of the vehicle, the abnormality detecting means calculating a vehicle deceleration based on the variable state detected by the variable state detecting means when the brake pedal is under operation and detecting the abnormality of the automatic hydraulic pressure generator by comparing the calculated vehicle deceleration with the vehicle deceleration detected or estimated by the deceleration detecting means.

5. The vehicle motion control device according to claim 4, further comprising:

stroke detecting means for detecting a stroke of the brake pedal;

the abnormality detecting means judging and memorizing whether the deceleration detecting means is normally operated based on the detected result of the stroke detecting means and the vehicle deceleration detected or estimated by the deceleration detecting means when the brake pedal is under operation; and when a difference between the calculated vehicle deceleration and the vehicle deceleration detected or estimated by the deceleration detecting means is greater than a predetermined value and when it is memorized that an operation of the hydraulic pressure detecting means is normal when the brake pedal is not under operation, the abnormality detecting means judges that the automatic hydraulic pressure generator is abnormal.

6. The vehicle motion control device according to claim 4, wherein the booster is a vacuum booster comprising;

a movable wall;

a constant pressure chamber formed forwardly of the movable wall and into which vacuum pressure is introduced;

a variable pressure chamber formed rearwardly of the movable wall for selectively communicating with the constant pressure chamber and with atmospheric air; and a valve mechanism for establishing and interrupting communication between the constant pressure chamber and the variable pressure chamber and for establishing and interrupting communication between the variable pressure chamber and the atmosphere, the booster actuator comprising:
   a linear solenoid disposed in the vacuum booster for actuating the valve mechanism through energization of the solenoid irrespective of the brake pedal operation and for controlling the valve mechanism in accordance with an amount of energization of the solenoid; and the variable state detecting means detecting an electric current of the linear solenoid as the variable state of the booster actuator.

7. A vehicle motion control device comprising:

a wheel cylinder equipped on a vehicle wheel for providing a braking torque;

an automatic hydraulic pressure generator including a master cylinder, a booster and a booster actuator, the master cylinder supplying a master cylinder hydraulic pressure to the wheel cylinder, the booster boosting actuation of the master cylinder in accordance with operation of a brake pedal, and the booster actuator actuating the booster irrespective of the operation of the brake pedal and generating the master cylinder hydraulic pressure in the master cylinder;

a hydraulic pressure control valve disposed between the automatic hydraulic pressure generator and the wheel cylinder for controlling a brake hydraulic pressure of the wheel cylinder;

control means for controlling the booster actuator of the automatic hydraulic pressure generator and the hydraulic pressure control valve in accordance with a running condition of the vehicle and for performing an automatic pressure increase control to the wheel cylinder;

abnormality detecting means for detecting an abnormality of the automatic hydraulic pressure generator; and abnormality transaction means for performing a predetermined transaction with respect to the automatic pressure increase control by the control means when the abnormality detecting means detects the abnormality of the automatic hydraulic pressure generator, wherein the abnormality transaction means prohibits the automatic pressure increase control by the control means when the abnormality detecting means detects the abnormality of the automatic hydraulic pressure generator.

8. A vehicle motion control device comprising:

a wheel cylinder operatively associated with a vehicle wheel for applying a braking force:

an automatic hydraulic pressure generator including a master cylinder, a booster and a booster actuator, the master cylinder supplying a master cylinder hydraulic pressure to the wheel cylinder, the booster boosting actuation of the master cylinder in accordance with operation of a brake pedal, and the booster actuator actuating the booster irrespective of the operation of the brake medal and generating the master cylinder hydraulic pressure in the master cylinder;

a hydraulic pressure control valve disposed between the automatic hydraulic pressure generator and the wheel cylinder for controlling a brake hydraulic pressure of the wheel cylinder;

control means for controlling the booster actuator of the automatic hydraulic pressure generator and the hydraulic pressure control valve in accordance with a running condition of the vehicle and for performing an automatic pressure increase control to the wheel cylinder;

deceleration detecting means for detecting or estimating a vehicle deceleration of the vehicle;

hydraulic pressure detecting means for detecting the master cylinder hydraulic pressure;

means for determining whether at least one of the deceleration detecting means and the hydraulic pressure detecting means is operating normally;

abnormality detecting means for detecting an abnormality of the automatic hydraulic pressure generator only when it is determined that at least one of the deceleration detecting means and the hydraulic pressure detecting means is operating normally during non-operation of the brake pedal; and abnormality transaction means for performing a predetermined transaction with respect to the automatic pressure increase control by the control means when the abnormality detecting means detects the abnormality of the automatic hydraulic pressure generator, wherein the booster actuator includes a solenoid, and further comprising:

means for detecting an electric current of the solenoid;

the abnormality detecting means calculating a master cylinder pressure converted value based on the detected electric current of the solenoid during non-operation of the brake pedal and detecting the abnormality of the automatic hydraulic pressure generator by comparing the calculated master cylinder pressure converted value with the master cylinder hydraulic pressure detected by the hydraulic pressure detecting means.

9. The vehicle motion control device according to claim 8, further comprising:

stroke detecting means for detecting a stroke of the brake pedal;

the abnormality detecting means judging and memorizing whether the hydraulic pressure detecting means is normally operated based on a detected result of the stroke detecting means and the master cylinder hydraulic pressure detected by the hydraulic pressure detecting means when the brake pedal is under operation, and the abnormality detecting means judging that the automatic hydraulic pressure generator is abnormal when a difference between the calculated master cylinder pressure converted value and the master cylinder hydraulic pressure detected by the hydraulic pressure detecting means is greater than a predetermined value and when it is memorized that operation of the hydraulic pressure detecting means is normal during non-operation of the brake pedal.

10. A vehicle motion control device comprising:

a wheel cylinder operatively associated with a vehicle wheel for applying a braking force:

an automatic hydraulic pressure generator including a master cylinder, a booster and a booster actuator, the master cylinder supplying a master cylinder hydraulic pressure to the wheel cylinder, the booster boosting actuation of the master cylinder in accordance with operation of a brake pedal, and the booster actuator actuating the booster irrespective of the operation of the brake pedal and generating the master cylinder hydraulic pressure in the master cylinder;

a hydraulic pressure control valve disposed between the automatic hydraulic pressure generator and the wheel cylinder for controlling a brake hydraulic pressure of the wheel cylinder;

control means for controlling the booster actuator of the automatic hydraulic pressure generator and the hydraulic pressure control valve in accordance with a running condition of the vehicle and for performing an automatic pressure increase control to the wheel cylinder;

deceleration detecting means for detecting or estimating a vehicle deceleration of the vehicle;

hydraulic pressure detecting means for detecting the master cylinder hydraulic pressure;

means for determining whether at least one of the deceleration detecting means and the hydraulic pressure detecting means is operating normally;

abnormality detecting means for detecting an abnormality of the automatic hydraulic pressure generator only when it is determined that at least one of the deceleration detecting means and the hydraulic pressure detecting means is operating normally during non-operation of the brake pedal; and abnormality transaction means for performing a predetermined transaction with respect to the automatic pressure increase control by the control means when the abnormality detecting means detects the abnormality of the automatic hydraulic pressure generator, wherein the booster actuator includes a solenoid, and further comprising:

means for detecting an electric current of the solenoid;

deceleration detecting means for detecting or estimating a vehicle deceleration of the vehicle, the abnormality detecting means calculating a vehicle deceleration converted value based on the calculated master cylinder pressure converted value during non-operation of the brake pedal, and detecting the abnormality of the automatic hydraulic pressure generator by comparing the calculated vehicle deceleration converted value with the vehicle deceleration detected or estimated by the deceleration detecting means.

11. The vehicle motion control device according to claim 10, further comprising:

stroke detecting means for detecting a stroke of the brake pedal;

the abnormality detecting means judging and memorizing whether the deceleration detecting means is normally operated during non-operation of the brake pedal; and the abnormality detecting means judging that the automatic hydraulic pressure generator is abnormal when a difference between the calculated vehicle deceleration converted value and the vehicle deceleration detected or estimated by the deceleration detecting means is greater than a predetermined value and when it is memorized that an operation of the hydraulic pressure detecting means is normal during non-operation of the brake pedal.

12. A method of controlling vehicle motion in a vehicle that includes a wheel cylinder operatively associated with a vehicle wheel for applying a braking force to the wheel, an automatic hydraulic pressure generator having a master cylinder, a booster and a booster actuator, with the master cylinder supplying master cylinder hydraulic pressure to the wheel cylinder, the booster boosting actuation of the master cylinder in accordance with operation of a brake pedal and the booster actuator actuating the booster irrespective of operation of the brake pedal to generate the master cylinder hydraulic pressure in the master cylinder, and a hydraulic pressure control valve disposed between the automatic hydraulic pressure generator and the wheel cylinder for controlling a brake hydraulic pressure of the wheel cylinder, the method comprising:

controlling the booster actuator of the automatic hydraulic pressure generator and the hydraulic pressure control valve based on a running condition of the vehicle to perform an automatic pressure increase control to the wheel cylinder;

detecting an abnormality of the automatic hydraulic pressure generator; and performing a predetermined operation with respect to the automatic pressure increase control when an abnormality of the automatic hydraulic pressure generator is detected, wherein the predetermined operation that is performed involves prohibiting the automatic pressure increase control when the abnormality of the automatic hydraulic pressure generator is detected.

13. A method of controlling vehicle motion in a vehicle that includes a wheel cylinder operatively associated with a vehicle wheel for applying a braking force to the wheel, an automatic hydraulic pressure generator having a master cylinder, a booster and a booster actuator, with the master cylinder supplying master cylinder hydraulic pressure to the wheel cylinder, the booster boosting actuation of the master cylinder in accordance with operation of a brake pedal and the booster actuator actuating the booster irrespective of operation of the brake pedal to generate the master cylinder hydraulic pressure in the master cylinder, and a hydraulic pressure control valve disposed between the automatic hydraulic pressure generator and the wheel cylinder for controlling a brake hydraulic pressure of the wheel cylinder, the method comprising:

controlling the booster actuator of the automatic hydraulic pressure generator and the hydraulic pressure control valve based on a running condition of the vehicle to perform an automatic pressure increase control to the wheel cylinder;

detecting an abnormality of the automatic hydraulic pressure generator;

performing a predetermined operation with respect to the automatic pressure increase control when an abnormality of the automatic hydraulic pressure generator is detected;

detecting the master cylinder hydraulic pressure;

detecting a variable state of the booster actuator;

calculating a master cylinder hydraulic pressure converted value based on the detected variable state of the booster actuator;

determining a difference between the detected master cylinder hydraulic pressure and the calculated master cylinder hydraulic pressure converted value.

14. The method according to claim 13, wherein the booster actuator includes a solenoid and the detected variable state of the booster actuator includes an electric current of the solenoid.

15. A method of controlling vehicle motion in a vehicle that includes a wheel cylinder operatively associated with a vehicle wheel for applying a braking force to the wheel, an automatic hydraulic pressure generator having a master cylinder, a booster and a booster actuator, with the master cylinder supplying master cylinder hydraulic pressure to the wheel cylinder, the booster boosting actuation of the master cylinder in accordance with operation of a brake pedal and the booster actuator actuating the booster irrespective of operation of the brake pedal to generate the master cylinder hydraulic pressure in the master cylinder, and a hydraulic pressure control valve disposed between the automatic hydraulic pressure generator and the wheel cylinder for controlling a brake hydraulic pressure of the wheel cylinder, the method comprising:

controlling the booster actuator of the automatic hydraulic pressure generator and the hydraulic pressure control valve based on a running condition of the vehicle to perform an automatic pressure increase control to the wheel cylinder;

detecting an abnormality of the automatic hydraulic pressure generator; performing a predetermined operation with respect to the automatic pressure increase control when an abnormality of the automatic hydraulic pressure generator is detected;

detecting the master cylinder hydraulic pressure by way of a hydraulic pressure detecting means;

calculating a first master cylinder hydraulic pressure converted value based on operation of the brake pedal;

calculating a difference between the calculated first master cylinder hydraulic pressure converted value and the detected master cylinder hydraulic pressure; and determining whether the hydraulic pressure detecting means is operating normally based on a comparison of the difference between the calculated first master cylinder hydraulic pressure converted value and the detected master cylinder hydraulic pressure with a first predetermined value.

16. The method according to claim 15, further comprising:

detecting a variable state of the booster actuator;

calculating a second master cylinder hydraulic pressure converted value based on the detected variable state of the booster actuator;

calculating a difference between the calculated second master cylinder hydraulic pressure converted value and the detected master cylinder hydraulic pressure; and detecting the abnormality of the automatic hydraulic pressure generator during non-operation of the brake pedal when the difference between the calculated second master cylinder hydraulic pressure converted value and the detected master cylinder hydraulic pressure is greater than a second predetermined value and when it is detected that the hydraulic pressure detecting means is operating normally.

17. A method of controlling vehicle motion in a vehicle that includes a wheel cylinder operatively associated with a vehicle wheel for applying a braking force to the wheel, an automatic hydraulic pressure generator having a master cylinder, a booster and a booster actuator, with the master cylinder supplying master cylinder hydraulic pressure to the wheel cylinder, the booster boosting actuation of the master cylinder in accordance with operation of a brake pedal and the booster actuator actuating the booster irrespective of operation of the brake pedal to generate the master cylinder hydraulic pressure in the master cylinder, and a hydraulic pressure control valve disposed between the automatic hydraulic pressure generator and the wheel cylinder for controlling a brake hydraulic pressure of the wheel cylinder, the method comprising:

controlling the booster actuator of the automatic hydraulic pressure generator and the hydraulic pressure control valve based on a running condition of the vehicle to perform an automatic pressure increase control to the wheel cylinder;

detecting an abnormality of the automatic hydraulic pressure generator;

performing a predetermined operation with respect to the automatic pressure increase control when an abnormality of the automatic hydraulic pressure generator is detected;

detecting a longitudinal vehicle deceleration by way of a longitudinal sensor;

detecting a variable state of the booster actuator;

calculating a master cylinder hydraulic pressure converted value based on the detected variable state of the booster actuator;

calculating a vehicle body deceleration converted value based on the calculated master cylinder hydraulic pressure converted value;

calculating a difference between the calculated vehicle body deceleration converted value and the detected longitudinal vehicle deceleration;

determining whether the longitudinal sensor is operating normally; and detecting the abnormality of the automatic hydraulic pressure generator during non-operation of the brake pedal when the difference between the calculated vehicle body deceleration converted value and the detected longitudinal vehicle deceleration is greater than a predetermined value and when it is detected that the longitudinal sensor is operating normally.

* * * * *